United States Patent
Jiang et al.

(10) Patent No.: US 10,235,991 B2
(45) Date of Patent: Mar. 19, 2019

(54) HYBRID PHONEME, DIPHONE, MORPHEME, AND WORD-LEVEL DEEP NEURAL NETWORKS

(71) Applicant: Apptek, Inc., Mclean, VA (US)

(72) Inventors: Jintao Jiang, Great Falls, VA (US); Hassan Sawaf, Los Gatos, CA (US); Mudar Yaghi, McLean, VA (US)

(73) Assignee: AppTek, Inc., McLean, VA (US)

( * ) Notice: Subject to any disclaimer, the term of this patent is extended or adjusted under 35 U.S.C. 154(b) by 0 days.

(21) Appl. No.: 15/672,486

(22) Filed: Aug. 9, 2017

(65) Prior Publication Data
US 2018/0047385 A1     Feb. 15, 2018

Related U.S. Application Data

(60) Provisional application No. 62/372,539, filed on Aug. 9, 2016.

(51) Int. Cl.
| | |
|---|---|
| *G10L 15/00* | (2013.01) |
| *G10L 15/06* | (2013.01) |
| *G10L 15/16* | (2006.01) |
| *G10L 15/32* | (2013.01) |
| *G10L 15/02* | (2006.01) |
| *G10L 15/187* | (2013.01) |
| *G10L 25/30* | (2013.01) |

(52) U.S. Cl.
CPC ............ *G10L 15/063* (2013.01); *G10L 15/02* (2013.01); *G10L 15/16* (2013.01); *G10L 15/187* (2013.01); *G10L 15/32* (2013.01); *G10L 25/30* (2013.01)

(58) Field of Classification Search
USPC .................................. 704/231–257, 270–275
See application file for complete search history.

(56) References Cited

U.S. PATENT DOCUMENTS

| | | | |
|---|---|---|---|
| 6,236,966 B1 * | 5/2001 | Fleming .................. | G10L 13/08 704/259 |
| 9,552,547 B2 * | 1/2017 | Leeman-Munk ........ | G06N 3/08 |
| 2007/0288242 A1 * | 12/2007 | Spengler ................. | G10L 15/20 704/275 |
| 2014/0067738 A1 * | 3/2014 | Kingsbury ............... | G06N 3/08 706/20 |
| 2015/0161522 A1 * | 6/2015 | Saon ........................ | G06N 3/08 706/12 |
| 2017/0025117 A1 * | 1/2017 | Hong ....................... | G10L 15/19 |
| 2017/0270910 A1 * | 9/2017 | Jung ....................... | G10L 15/063 |

\* cited by examiner

*Primary Examiner* — Jesse S Pullias
(74) *Attorney, Agent, or Firm* — Morgan, Lewis & Bockius LLP; Robert C. Bertin; Rachael Lea Leventhal

(57) ABSTRACT

A hybrid frame, phone, diphone, morpheme, and word-level Deep Neural Networks (DNN) in model training and applications-is based on training a regular ASR system, which can be based on Gaussian Mixture Models (GMM) or DNN. All the training data (in the format of features) are aligned with the transcripts in terms of phonemes and words with the timing information and new features are formed in terms of phonemes, diphones, morphemes, and up to words. Regular ASR produces a result lattice with timing information for each word. A feature is then extracted and sent to the word-level DNN for scoring Phoneme features are sent to corresponding DNNs for training. Scores are combined to form the word level scores, a rescored lattice and a new recognition result.

9 Claims, 10 Drawing Sheets

HYBRID PHONEME, DIPHONE, MORPHEME, AND WORD-LEVEL DEEP NEURAL NETWORKS

CROSS REFERENCE TO RELATED APPLICATIONS

This application is related to earlier filed U.S. Provisional Patent Application No. 62/372,539, filed on Aug. 9, 2016, and entitled Hybrid Phoneme, Diphone, Morpheme, and Word-Level Deep Neural Networks. Applicant claims priority to this application, which is incorporated by reference in its entirety herein.

FIELD OF THE INVENTION

The present invention relates generally to speech recognition and, more particularly, to systems and methods for speech recognition based on hybrid frame, phone, diphone, morpheme and word level deep neural networks (DNN).

BACKGROUND OF THE INVENTION

Automatic speech recognition (ASR) technology has advanced rapidly with increasing computing power available in devices of all types. It remains, however, a computationally intensive activity. There remains a need to process speech using neural networks and other architectures that can be efficiently trained based on available resources.

SUMMARY OF THE INVENTION

According to an embodiment of the present invention, an approach of hybrid frame, phone, diphone, morpheme, and word-level Deep Neural Networks (DNN) in model training is used. It may be applied to many applications, including ASR. The approach is based on a regular ASR system, which can be based on Gaussian Mixture Models (GMM) or DNN.

First, a regular ASR model is trained. As a natural output from the initial training, all the training data (in the format of features) are aligned with the transcripts in terms of phonemes and words with the timing information. Feature normalization can be applied for these new features. Based on the alignment timing information, new features are formed in terms of phonemes, diphones, morphemes, and up to words.

The features may be of different sizes due to the different durations of phonemes, diphones, morphemes, and words. The features may be padded with 0 to have the same lengths (e.g., 30 frames for phonemes, 60 frames for diphones, and 100 frames for words). Using American English as an example, there are about 42 phonemes plus silence, 1764 diphones, and a most frequent 5000 words. For each category, a DNN model is trained. In the ASR application, a first pass regular speech recognition is performed, and the result lattice is produced. In the lattice, there is the timing information for each word. A feature is then extracted and sent to the word-level DNN for scoring. If the word is not in the word-level DNN vocabulary, then a forced alignment is performed to get the timing information for each phoneme. Then features from these phonemes, diphones, and morphemes are sent to the corresponding DNNs for training. And these scores are combined to form the word level scores. In this way, the lattice is being rescored, and a new recognition result is produced. Given the discriminant nature of DNN training, the DNN scores of these phoneme/diphone/morpheme/word segments can serve in part the confidence scores. In this manner, DNN models are trained in phoneme, diphone, morpheme, and word levels, compared to the traditional frame level.

According to one embodiment of the invention, a system for processing audio comprises a memory and a processor. The memory, stores program instructions for training DNN models, preparing features and aligning units in the levels of phonemes, diphones, morephemes and/or words to audio. The processor is coupled to the memory and executes the program instructions, generates a DNN in the memory, receives the features and audio and assigns corresponding data to levels of the DNN, and processes training data to create frame, phoneme, diphone, morpheme, and word-level DNN models separately.

The processor may further execute the program instructions to process the audio file to create scores for annotating a lattice and to re-score the lattice based on the phoneme, diphone, morpheme, and word-level DNN models. The memory may further include program instructions for combining the phoneme DNN scores into a word score. The memory may further include a program for combining phoneme, diphone, or morpheme scores individually or in any combination into word scores.

In another embodiment, the memory further includes program instructions for combining new word-level DNN scores with traditional ASR confidence scores to form new confidence scores and the processor executes the program instructions to combines the new word-level DNN scores with the traditional ASR confidence scores to form new confidence scores.

In still another embodiment, a method of training speech recognition systems includes: training a DNN system using a traditional ASR tool based on audio and transcript data; aligning features with at least two selected ones of phonemes, diphones, morphemes and words independent of frames; preparing new features and alignments for the respective selected ones of the phonemes, diphones, morphemes and words; normalizing the new features; and training new DNN models based on the new features and alignments separately for each of the respective selected ones of the phonemes, diphones, morphemes and words.

The method of training speech recognition systems may further include: normalizing features for the respective selected ones of the phonemes, diphones, morphemes and words as part of the preparing. In addition, the method may include post processing the traditional ASR result lattices by applying the new DNN models to the result lattices by rescoring words based on combinations of the selected phoneme, diphone, and morpheme scores associated with each rescored word.

BRIEF DESCRIPTION OF THE FIGURES

The above described features and advantages of the invention will be more fully appreciated with reference to the appended drawing figures, in which.

DETAILED DESCRIPTION

Figure 1:
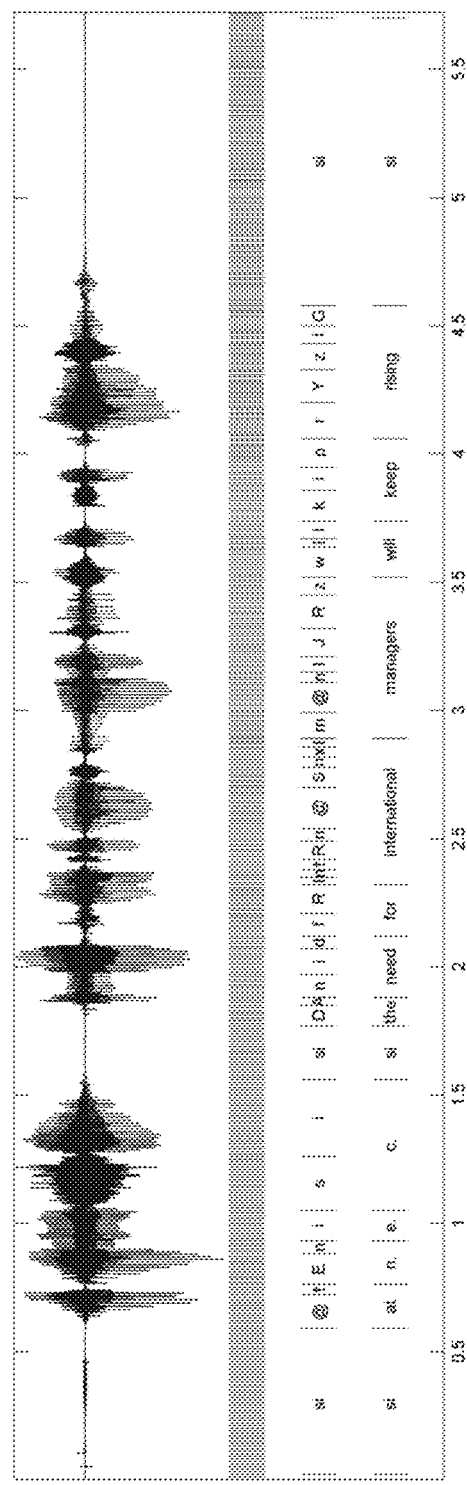
FIG. 1 depicts an illustrative image of alignments corresponding to an audio file showing a feature series, phoneme alignments, and word alignments that may be generated according to one illustrative embodiment of the invention.

According to an embodiment of the present invention, an approach of hybrid frame, phone, diphone, morpheme, and word-level Deep Neural Networks (DNN) in model training is used. It may be applied to many applications, including ASR. The approach is based on a regular ASR system, which can be based on Gaussian Mixture Models (GMM) or DNN.

ASR System

First, a regular ASR model is trained. As a natural output from the initial training, all the training data (in the format of features) are aligned with the transcripts in terms of phonemes and words with the timing information. Feature normalization can be applied for these new features. Based on the alignment timing information, new features are formed in terms of phonemes, diphones, morphemes, and up to words.

The features may be of different sizes due to the different durations of phonemes, diphones, morphemes, and words. The features may be padded with 0 to have the same lengths (e.g., 30 frames for phonemes, 60 frames for diphones, and 100 frames for words). Using American English as an example, there are about 42 phonemes plus silence, 1764 diphones, and a most frequent 5000 words. For each category, a DNN model is trained. In the ASR application, a first pass regular speech recognition is performed, and the result lattice is produced. In the lattice, there is the timing information for each word. A feature is then extracted and sent to the word-level DNN for scoring. If the word is not in the word-level DNN vocabulary, then a forced alignment is performed to get the timing information for each phoneme. Then features from these phonemes, diphones, and morphemes are sent to the corresponding DNNs for training. And these scores are combined to form the word level scores. In this way, the lattice is being rescored, and a new recognition result is produced. Given the discriminant nature of DNN training, the DNN scores of these phoneme/diphone/morpheme/word segments can serve in part the confidence scores. In this manner, DNN models are trained in phoneme, diphone, morpheme, and word levels, compared to the traditional frame level.

There are two main approaches for ASR: Gaussian Mixture Models (GMM) and Deep Neural Networks (DNN). Here, we use DNN as an example. More specifically, the initial system is a hybrid HMM-DNN approach (c.f., the tandem approach).

One can use available tools to train a deep neural networks (DNN) triphone model using Kaldi, RWTH ASR, or other Toolkits, which have standard components like DNN, triphone, linear discrimination analysis ("LDA"), etc. To train a DNN triphone model, audio and corresponding transcription is needed. This type of data can be obtained from LDA or other channels. In addition, word pronunciations are needed. One can use the CMU pronunciation dictionary for this purpose. For an out-of-vocabulary word, generally a grapheme-to-phoneme tool is used to predict the out-of-vocabulary word's pronunciation. To train a triphone model, linguistic grouping should be prepared according to one embodiment. This can be obtained from standard linguistic text books with groupings such as voicing, labial, dental, plosive, etc.

In an example described herein, a RWTH ASR Toolkit may be used along with audio data with associated transcriptions. Illustrative data may also include word pronunciations data, a RWTH grapheme-to-phoneme conversion tool, and a general linguistic question list. For example, there may be 4501 classes in the triphone decision tree grouping. The audio has 16 kHz sampling rate for this example but may be any rate. The acoustic features are standard MFCC features, which have a frame size of 25 ms, a frame shift of 10 ms, and output size of 16 coefficients per frame. MFCC features are transformed with LDA with a window size of 9 frames and an output size of 45. Usually, the initial acoustic models are trained with traditional GMM modeling to obtain the alignment and triphone groupings, and LDA transformation. After the initial modeling, fifteen consecutive LDA features are concatenated to form a 675 dimension vector per frame. The concatenated features in this example are first mean and variance normalized and then fed to the DNN training.

The DNN model is trained first with supervised pre-training and then is followed by fine-tuning. The DNN has five hidden layers with 1280 nodes each. The output SoftMax layer has 3500 nodes. The training is performed on a CUDA-enabled GPU machine. DNN modeling generally produces better results than traditional GMM. Both Kaldi and RWTH toolkits provide recipes for supervised pre-training and fine-tuning. In pre-training, the first hidden layer is trained and fixed; Then, the second hidden layer is added, trained, and fixed; and so on and so forth. During fine-tuning, the DNN learning rate is controlled using a Newbob protocol. After each iteration, the new DNN model is evaluated against a development data set on the frame classification error. The new learning rate depends on the improvement on the frame classification error; and the fine-tuning stops when the improvement is very small.

The DNN model training is the standard procedure. After the DNN model training, all the training data can be aligned in the phoneme level and/or word level using the GMM or DNN models (see FIG. 1 for the alignment examples). The figure shows that features are produced at every 10 milliseconds without knowing their context.

FIG. 1 depicts an illustrative image of an alignment that corresponds to an audio file, the feature series, phoneme alignments, and word alignments that may be generated according to one illustrative embodiment of the invention. Referring to FIG. 1, the horizontal axis is represented by time in seconds and the vertical axis is divided into three sections: The audio waveform 10 (top), the phoneme alignments 20 (middle), and the word alignments 30 (bottom).

Referring to FIG. 1, the symbols (si, @, t, E, n, etc.) are phoneme representations. The vertical bars indicate the boundaries for phonemes or words. The overall image is a display of the phoneme and word alignment after initial GMM and DNN model training. The same approach may be used to prepare phoneme, diphone, morpheme, and word-level features and alignments.

Figure 2:
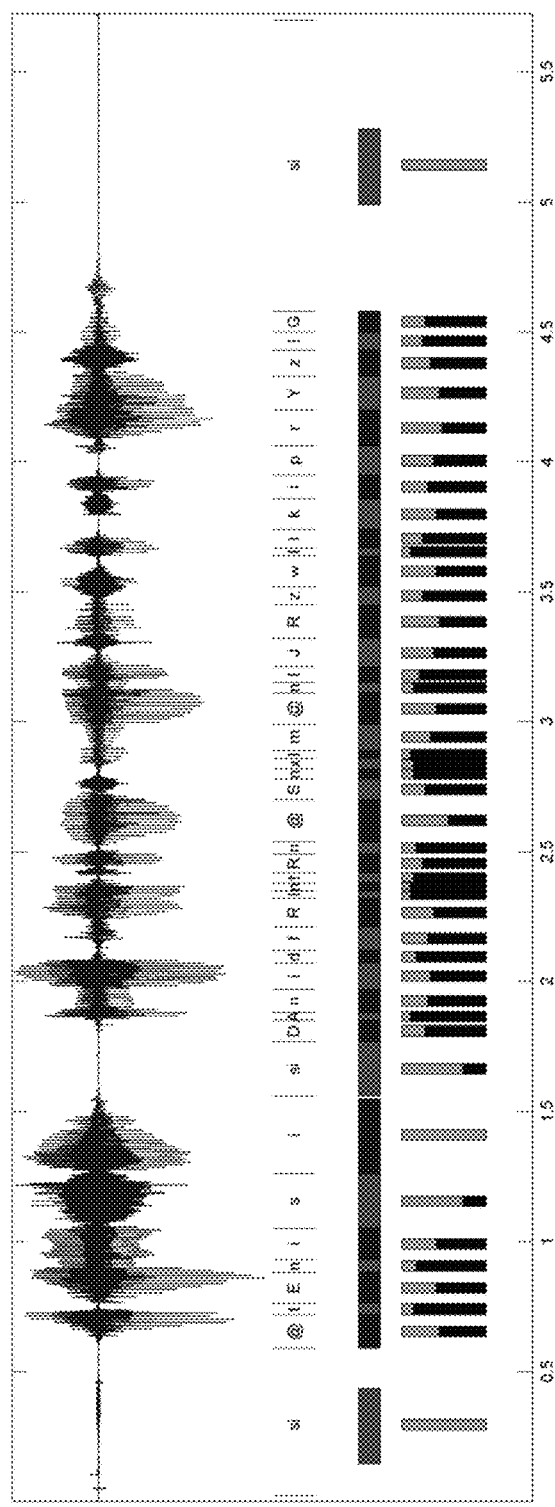
FIG. 2 depicts an illustrative image of alignments corresponding to an audio file showing the alignment of FIG. 1 and in addition features that are used for each phoneme and zero padding according to one illustrative embodiment of the invention.

Based on the alignments shown in FIG. 1, new features are prepared as shown in FIG. 2. FIG. 2 represents an illustrative image of feature preparation for phonemes. There may be other example feature preparation for other audio files. Referring to FIG. 2, the horizontal axis is represented by time in seconds and the vertical axis is divided into four sections. The first two sections 10 and 20 are the same in FIG. 1. The third section 40 represents the features that are used for each phoneme. For example, silence (si) uses only the center part of the segment. The bottom section 50 illustrates with bars how features are prepared. That is, if feature numbers are less than the targeted 30 frames, then zeros are padded, represented by the dark shading within a bar, to make them the same length for each phoneme. However, if a phoneme's duration is more than 30 frames, then only the center 30 frames are used without any zero padding. This is shown by the bars below the "si" and "i" phonemes, which do not have any zero padding and therefore have no dark shading in their respective bars 50. (The numbers are arbitrary here as an example). After the concatenation of features, certain normalization can be applied (e.g., mean or variance normalization). If the duration is less than 30 frames, then zeros are padded to make them the same length.

Figure 3:
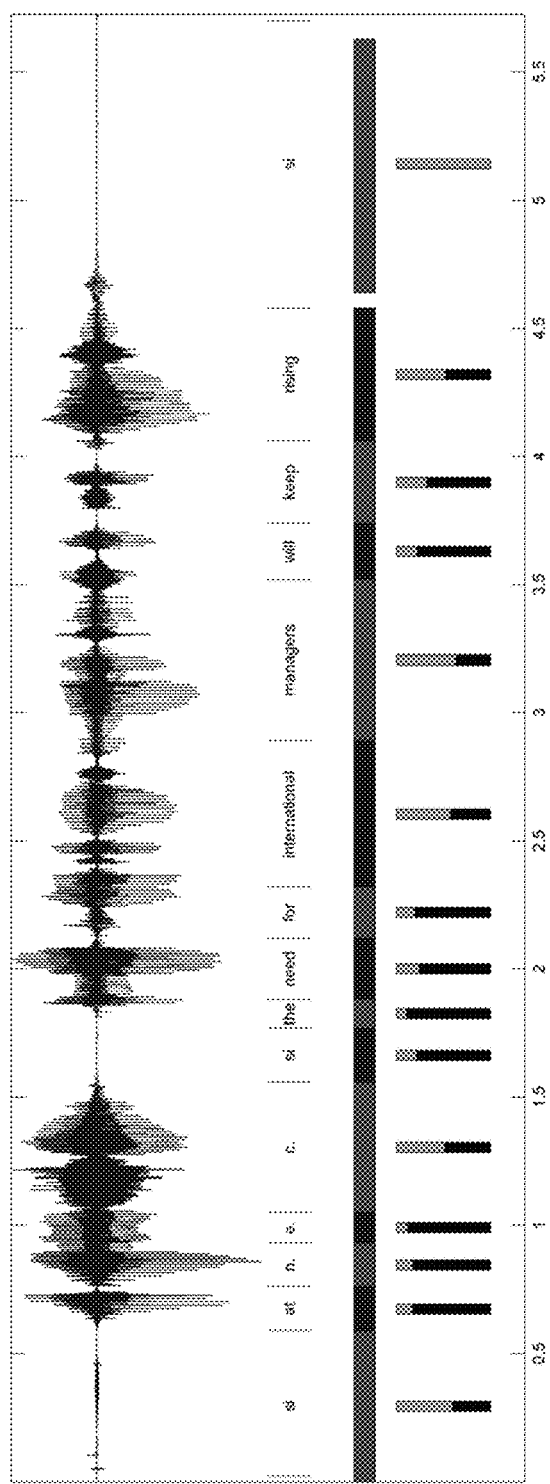
FIG. 3 depicts an illustrative image of word level alignment according to one illustrative embodiment of the invention.

FIG. 3 is similar to FIG. 2 except that now the alignment in the word level and a maximum of 100 frames are concatenated. Referring to FIG. 3, section 10 shows the audio stream and section 30 shows the word alignments. Section 60 shows the feature transitions at the word alignment boundaries and Section 70 shows with bars how the features are prepared with and without zero padding. The duration allocated to each feature is longer. All of the words have some zero padding reflected in the bars, except for the silence at the end, which has no padding. The features for words can be prepared as shown in FIG. 3. Note that the definition of word is based on the pronunciation rather than the written form. For example, the word "read" in the past tense is pronounced as /r E d/, which is the same as the pronunciation of the word "red." Therefore, they are the same word in the training as r_E_d. Diphone and morpheme features and alignments can be obtained using the similar approach.

For each case of phoneme, diphone, morphine, or word-level DNN training, a certain number of negative sample audio segments are prepared to train a garbage model (sometimes called a noise model).

Training DNNs for Phonemes, Diphones, Morphemes, and Words

In the previous step, both the features and alignments are obtained. Then DNN training can go ahead directly without the initial GMM modeling. Again, the training is done with pre-training and fine-tuning. Note here that the SoftMax output indices are one-to-one mapped to individual phonemes, diphones, morphemes, or words (see FIG. 4 for an illustration).

Figure 4:
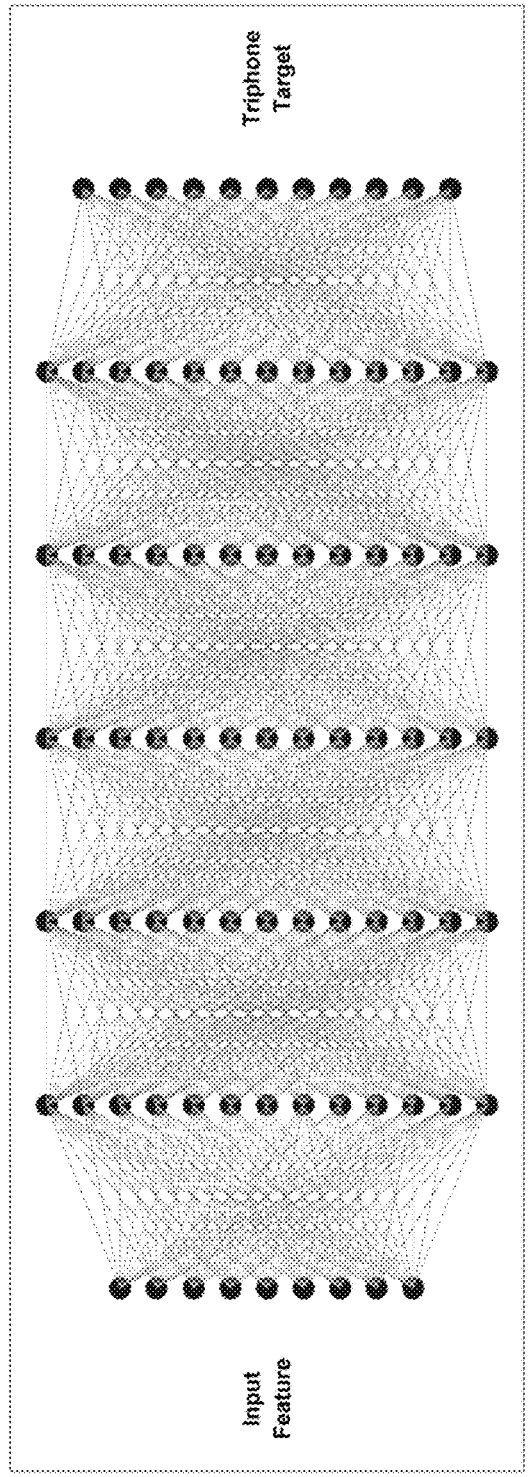
FIG. 4 depicts an illustrative DNN structure having an input feature layer, hidden layers, and a triphone target output layer according to one illustrative embodiment of the invention.

FIG. 4 depicts an illustrative DDN structure that may be trained according to one embodiment of the invention. Referring to FIG. 4, DNN includes an input feature layer 400, the hidden layers 420, and a triphone target output layer 450. Between layers, all nodes are connected.

The training uses the same DNN training protocol as in the initial frame-based DNN training, but with different features and alignments. Using the phoneme as an example (see FIG. 2), the input features are not the frame based features. Instead, they are now the concatenated features of phonemes. For example, the first phoneme /i/ has only 12 frames as shown in section 50 of FIG. 2. These 12 frames are concatenated to form a single vector. But it is less than 30 frames. Therefore 18 frames of zeros are padded to make this phoneme feature the same length as others. For the first silence (/si/), there are more than 30 frames. Only the center 30 frames are taken and concatenated. (This is one way of handling phoneme duration of more than 30 frames). In the initial training, there are 571 frames for this audio file; while for the phoneme-based training, there are only 45 phoneme features (45 phoneme in the alignment). Now the alignments are phonemes instead of triphones. Given these input features and alignments, one DNN model of a certain network structure, for example as shown in FIG. 4, can be trained using the standard approach. Similarly, the same procedure can be applied to diphones, morphemes, and words.

Application of the Trained Hybrid Frame, Phoneme, Diphone, Morphemes, and Word-Level DNN Models In this document, we use ASR as an example. The approach can be applied to other applications, and to name a few, they are interactive voice responses (IVR), keyword spotting, language identification (LID), etc. The traditional frame based DNN model is used for the first-pass recognition. To perform the ASR, one needs to prepare a language model and a lexicon. One can download text data from websites (e.g., CNN, Yahoo News, etc.). After that, language modeling tools SRILM or IRSTLM can be used. Lexicon can be prepared similarly as in the training, which uses a lexicon dictionary and using a grapheme-to-phoneme tool.

Figure 5:
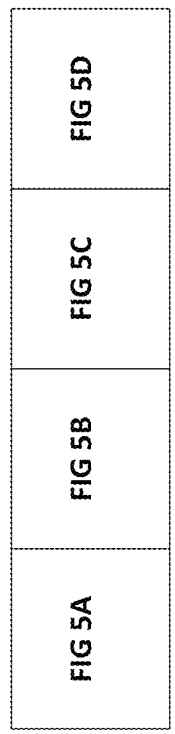
FIG. 5 depicts an example result lattice for the recognition of an audio files or streams according to an embodiment of the present invention, arranged as a left to right combination of FIGS. 5A-5D.
Figure 5A:
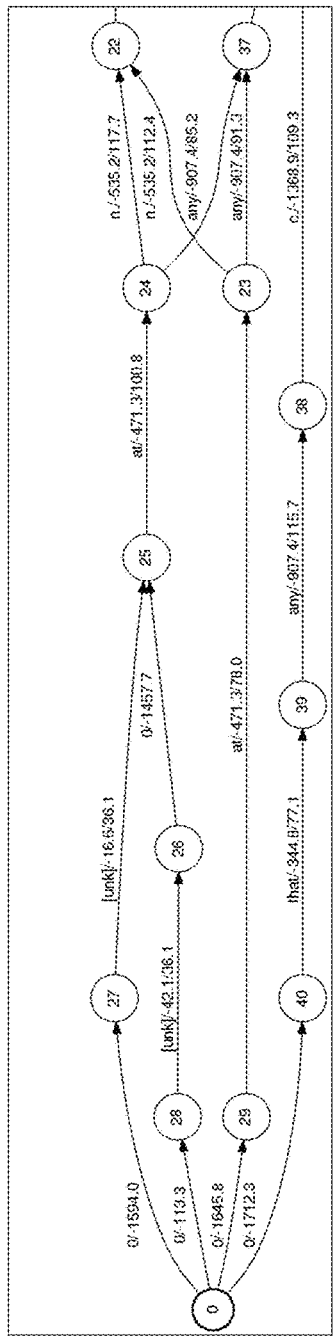
Figure 5B:
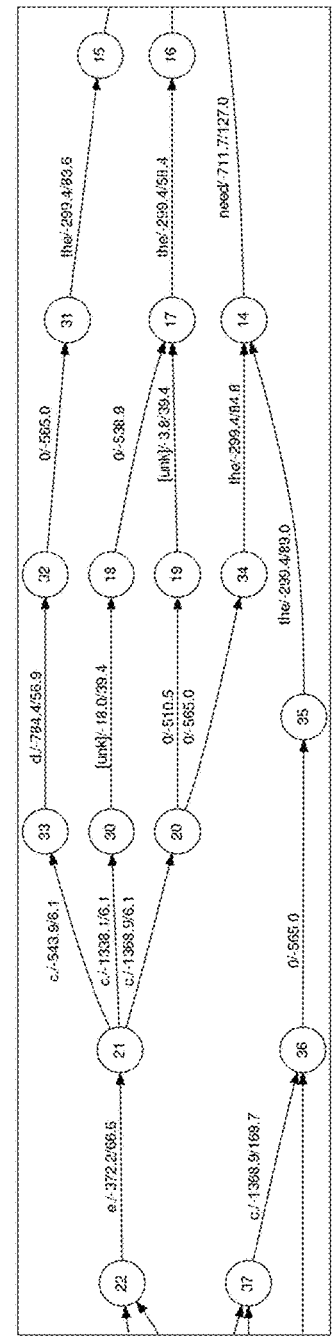
Figure 5C:
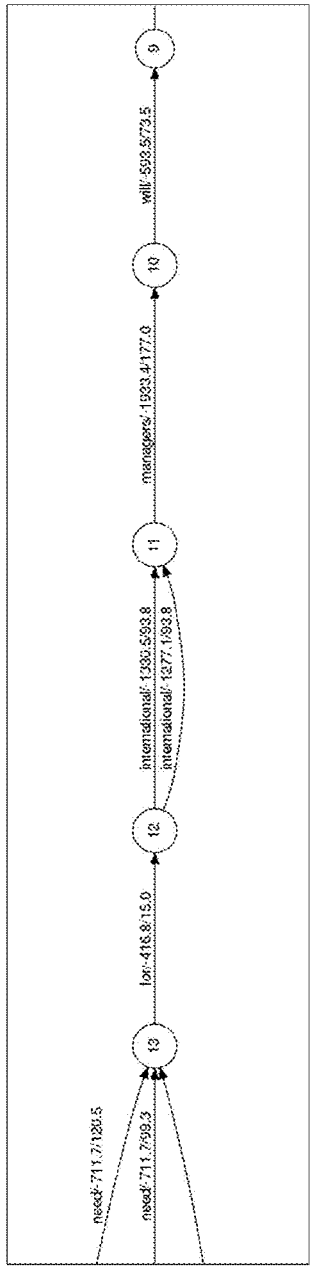
Figure 5D:
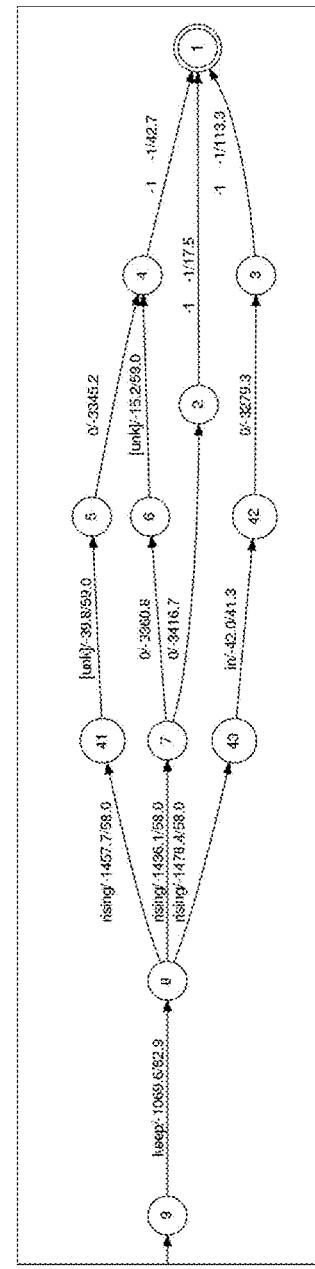

Usually the ASR output includes the top best recognition results and lattices. One example lattice is shown in FIG. 5, which represents the lattices shown collectively in FIGS. 5A-5D arranged from left to right as shown in FIG. 5. FIG. 5 depicts an example output for the recognition of an audio files or streams according to an embodiment of the present invention. Referring to FIG. 5, the horizontal axis is represented by time. That is, the position of the node on the horizontal axis represents its time in the audio file (from left to right). There are candidate recognition results for an audio file or stream. These nodes are interconnected, and they form different paths (arcs) from the start to the end. Each path represents one hypothesis recognition for the audio. For each arc, there is an input word, an acoustic score, a language model score in the format of "word/score1/score2." The best path is selected based on the scores (acoustic and language) associated with each word.

For each word in the lattice, there is an acoustic score, a language model score, the timing information, and the phoneme sequence in the word. If the word is in the word-level DNN word list, Then, the frame features for this word segment are concatenated to for a new feature (with zero-padding or shortening) to meet the size requirement. Then, the new feature is fed into the word-level DNN, and then a new score is obtained with the score. Using these scores, the lattice can be rescored, and new results are produced. If the word is not in the word-level DNN word list, then, the corresponding phonemes are used to do a force-alignment with the word segment. This alignment produces the boundary information for each phoneme. Similarly, features are prepared for each phoneme and submitted to the phoneme, diphone, and morpheme level DNN models. The scores are combined to form a new score for the word.

There are different ways of combining the phoneme scores. One approach is the duration weighted average.

Figure 6:
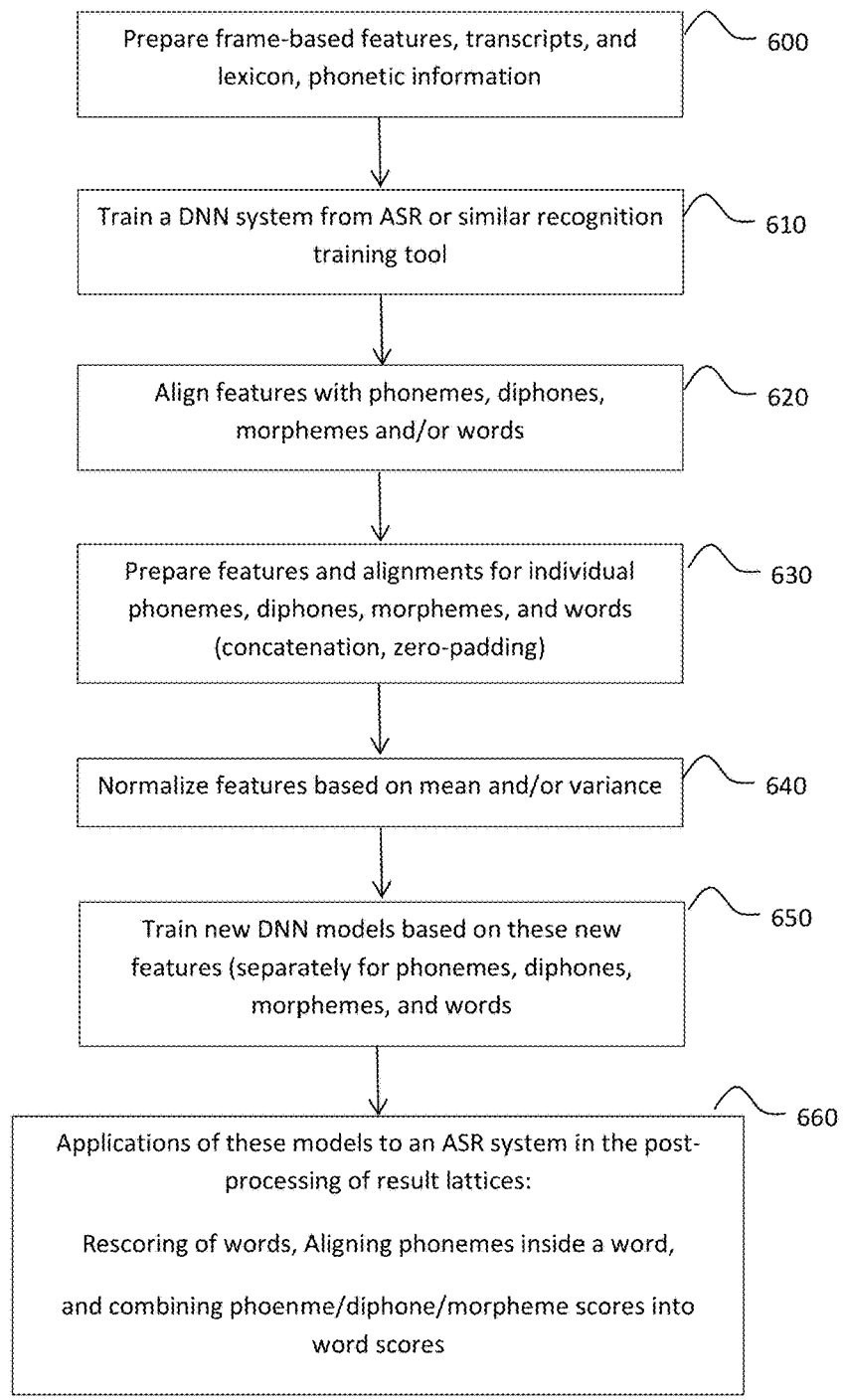
FIG. 6 depicts a method of training for phonemes, diphones, morphemes and words and in turn applying the training results to a recognition process according to one embodiment of the invention.

FIG. 6 depicts a method of training for phonemes, diphones, morphemes and words and in turn applying the training results to a recognition process. Referring to FIG. 6, in step 600, according to one embodiment of the method, the frame-based features, transcripts, lexicon and phonetic information is prepared. In step 610, a DNN system is trained from ASR or a similar recognition tool. In step 620, features are aligned with phonemes, diphones, morphemes and/or words. In step 630, the features and alignments for individual phonemes, diphones, morphemes and words are prepared so that they have the same duration for each type, with concatenation and zero padding as described above. In step 640, the features are normalized based on mean and/or variance. In step 650, new DNN models are trained based on the new features (separately for phonemes, diphones, morphemes and words). In step 660, the new DNN models are applied to an ASR system in the post processing of result lattices that includes rescoring of words, aligning phonemes inside of a word, and combining phoneme, diphone, morpheme scores into word scores.

Figure 7:
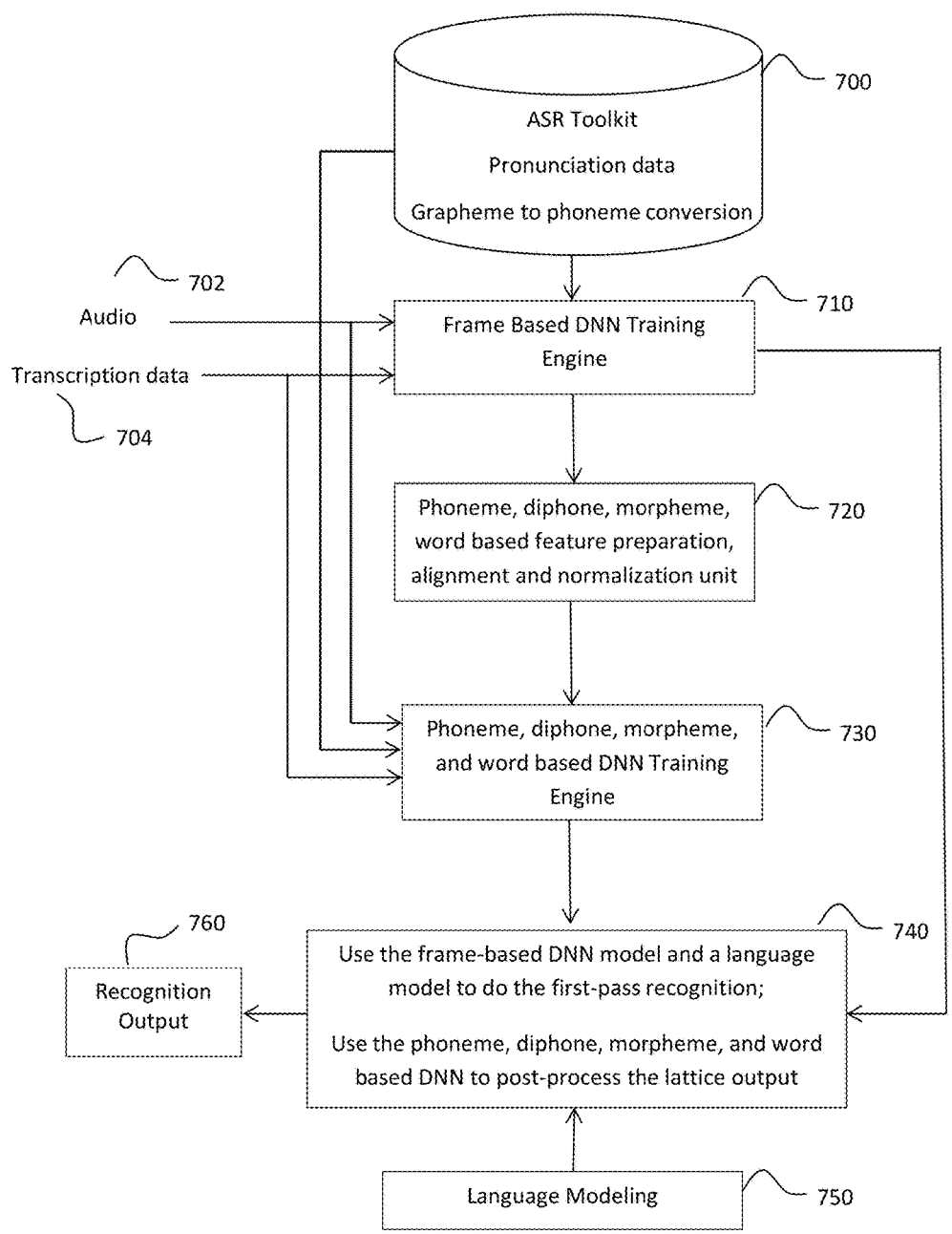
FIG. 7 depicts an illustrative system for training a recognition system using DNN in units of phonemes, diphones, morphemes and/or words.
Figure 8:
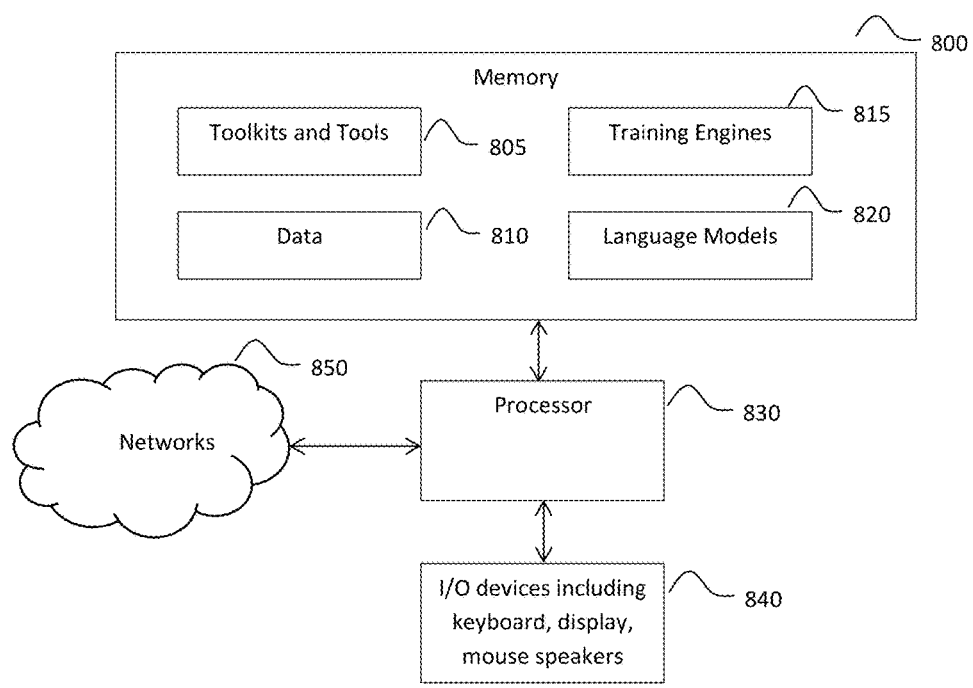
FIG. 8 depicts an illustrative system including a processor and memory for implementing systems and methods according to one embodiment of the invention.

FIG. 7 depicts an illustrative system for training using DNN in units of phonemes, diphones, morphemes and/or words. Referring to FIG. 7, a frame based DNN training engine 710 receives inputs including, for example audio inputs 702, transcription data 704, which may include transcripts and timing information relating the transcripts to the audio data and various other inputs including ASR data and pronunciation data, which may be stored in a separate database 700 as shown that is available to the engine 710. The pronunciation data may further be prepared using tools such as grapheme to phoneme conversion tools that are stored in the database 700 or otherwise made available. The DNN training engine 710 and other tool kits and databases 700 may be stored locally or remotely and accessible over a network. The databases 700 may be accessed by a server or other computer as shown in FIG. 8 that includes a processor 830 and a memory 800. The memory 800 (including the database) may also store the data 810, the toolkits and tools 805, the various inputs, including the audio and transcription inputs, including program instructions and may also store the training engines 815 and language models and anything else that will be executed by or used by the processor. The memory and processor may also implement the neurons of the neural networks that are set up and fine-tuned according to the techniques described herein. The processor 830 is operatively coupled to the memory 800, a network 850 to which the processor may send data and from which the processor may receive data. The database 700 may be operatively coupled, for example, to one of the networks 850. The processor may also coupled to other i/o devices 840 including a keyboard, display, speakers, a mouse and other typical hardware to enable the process to display or otherwise output information to a user and receive information from a user.

The processor 830 runs the various programs and program instruction based on the inputs to achieve trained DNN networks for units of phonemes, diphones, morphemes and/or words. The phoneme, diphone, morpheme, word based feature preparation, alignment and normalization unit 720, for example, may receive input from the frame based DNN Training Engine and use the information prepare feature alignments as described above for phonemes, diphones, morphemes and words. The prepared and aligned phonemes, diphones, morphemes and words may then be an input, along with the audio and transcription data 702 and 704 and information from the database 700 to the respective phoneme, diphone, morpheme and word based DNN training engine 730. The output from the phonement, diphone, morpheme and word based DNN training engine 730 and the frame based DNN training engine 710 is used to configure respective DNN structures 740 along with language models 750. The trained networks may then be used to process new audio or other files to facilitate scoring translations of words or their constituent parts in a stand-alone translation or to annotate translations being done using a frame based DNN approach, for example, to improve and acoustically rescore and to add additional confidence information to traditional ASR techniques and to produce recognition output 760.

While specific embodiments have been shown and described herein, it will be understood by those having ordinary skill in the art that changes may be made to those embodiments without departing from the spirit and scope of the invention.

What is claimed is:

1. A system for processing audio, comprising:
a memory, including program instructions for training DNN models, preparing features and aligning units of at least one of phonemes, diphones, morphemes, and words to audio independent of frame boundaries; and
a processor, coupled to the memory, that is capable of executing the program instructions to generate a DNN in the memory, receive the audio and assign corresponding aligned units of data to levels of the DNN, and process training data to create frame, phoneme, diphone, morpheme, and word-level DNN models separately; and
wherein the processor is further capable of executing the program instructions, and processing an audio file to create scores for annotating a lattice and rescoring the lattice based on the phoneme, diphone, morpheme, and word-level DNN models.

2. The system according to claim 1, further wherein:
the memory further includes a program for combining the phoneme DNN scores into a word score.

3. The system according to claim 2, wherein the processor further executes the programs to combine phoneme or phoneme, diphone, and/or morpheme scores into a word score.

4. The system according to claim 1, wherein memory further includes a program for combining phoneme, diphone, and morpheme scores into word scores.

5. The system according to claim 4, wherein:
the memory further includes a program for combining word-level DNN scores with traditional confidence scores to form new confidence scores.

6. The system according to claim 1, wherein the processor further executes the programs to combine phoneme or phoneme, diphone, and/or morpheme scores into a word score.

7. The system according to claim 6, wherein the processor further executes the programs to align respective features with at least two of phonemes, diphones, morphemes, and words and apply zero padding when a duration of the respective feature is less than a predetermined amount associated with each respective feature.

8. The system according to claim 6, wherein:
the memory further includes a program for combining word-level DNN scores with traditional confidence scores to form new confidence scores.

9. A method of training speech recognition systems, comprising:

training a DNN system using a traditional ASR tool based on audio and transcript data;

aligning features with at least two selected ones of phonemes, diphones, morphemes, and words independent of frames;

preparing new features and alignments for the respective selected ones of the phonemes, diphones, morphemes, and words;

normalizing the new features;

training new DNN models based on the new features and alignments separately for each of the respective selected ones of the phonemes, diphones, morphemes, and words;

post processing traditional ASR result lattices; and applying the newly trained DNN models to the result lattices by rescoring words based on combinations of the selected phoneme, diphone, and morpheme scores associated with each rescored word.

* * * * *